E. B. CANTRELL AND G. E. MILLER.
ROLLER BEARING REMOVER.
APPLICATION FILED DEC. 3, 1918.

1,310,155.

Patented July 15, 1919.

Inventors.
Edwin B. Cantrell
George E. Miller

By Strong & Townsend
Attys

UNITED STATES PATENT OFFICE.

EDWIN B. CANTRELL AND GEORGE E. MILLER, OF SAN FRANCISCO, CALIFORNIA.

ROLLER-BEARING REMOVER.

1,310,155. Specification of Letters Patent. Patented July 15, 1919.

Application filed December 3, 1918. Serial No. 265,132.

*To all whom it may concern:*

Be it known that we, EDWIN B. CANTRELL and GEORGE E. MILLER, citizens of the United States, residing at the city and county of San Francisco and State of California, have invented new and useful Improvements in Roller-Bearing Removers, of which the following is a specification.

This invention relates to a roller bearing remover.

One of the objects of the present invention is to provide a simple, cheaply manufactured, easily operated device for removing roller bearings such as are employed on automobiles and the like from the axle housing in which they are supported. Another object of the invention is to provide a device which is adapted to be securely attached to the roller bearing so that an endwise pull may be exerted thereon when the bearing is to be removed, and, furthermore to provide means for maintaining the roller bearing in absolute alinement with the axle while it is being removed. Other objects will hereinafter appear.

The invention consists of the combination, construction and arrangement of parts as hereinafter more fully described and claimed, having reference to the accompanying drawings in which—

Figure 1:
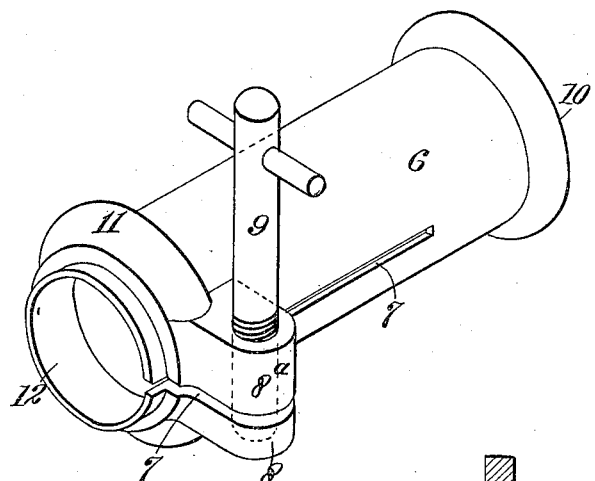
Figure 1 is a perspective view of the roller bearing remover.

Referring to the drawings in detail, A indicates the rear axle housing of a Ford automobile, 2 the axle or driving shaft, 3 the bearing bushing and 4 the roller bearing. This bearing consists of a plurality of rollers, such as shown, which are interposed between the axle 2 and the bearing bushing 3. These rollers are supported in a cage comprising a pair of end rings 5, which are secured together by tie rods not here shown, the form of roller bearing employed being a standard type of the well known Hyatt roller bearing.

In actual practice it is often found necessary to remove the roller bearing, particularly when working on the rear axle housing, the removal of the roller bearing being particularly necessary if it is desired to replace the bearing bushing 3. Considerable difficulty is generally encountered when an attempt is made to remove the roller bearing, as it is first of all difficult to grip the same so that an endwise pull sufficient to remove it may be exerted; secondly, because a slight tilting of the roller bearing when an endwise pull is exerted will cause it to jam between the axle and the bearing bushing; and, third, because burs or ridges are often formed both on the axle and on the bearing bushing which render it difficult to remove the bearing.

To overcome the difficulties enumerated it is first necessary to securely grip the bearing so that a sufficient endwise pull may be exerted, and, secondly, to maintain the bearing in absolute alinement with the shaft and the bearing bushing while it is being removed. We have accomplished this by providing the tool shown in Fig. 1.

This tool comprises a cylindrical shaped member 6, one end of which is split, as shown at 7, and provided with a pair of lugs 8 and 8$^a$ to permit the split end of the sleeve to be expanded and contracted. This is accomplished by threading the lug 8$^a$ and placing a screw 9 therein, which, when turned, engages the face of the lower lug 8 and thereby expands the sleeve. The sleeve is otherwise beaded at each end, as at 10 and 11, and a projecting annular shoulder is formed, as at 12, which is just slightly less in diameter than the inner diameter of the outer cage ring 5.

Figure 2:
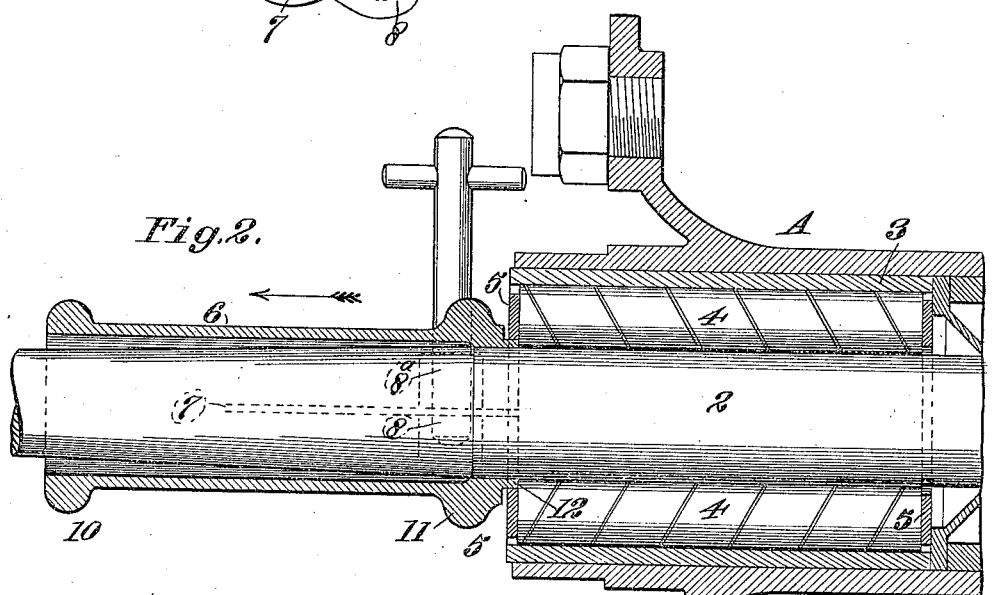
Fig. 2 is a detail sectional view of the rear axle housing of a Ford automobile showing the device in position to remove the roller bearing.

It is therefore possible to slip the tool over the spindle end of the axle and to force the annular shoulder 12 interior of the cage ring 5, as shown in Fig. 2. It is here secured by merely turning the screw 9 until the sleeve becomes sufficiently expanded. The tool will thereby become securely attached to the bearing ring and it is then possible to remove the entire roller bearing by merely exerting an endwise pull in the direction of arrow $a$. The inner diameter of the annular extension 12 is approximately the same as the outer diameter of the axle 2. Its surface therefore becomes a guide for the roller bearing which maintains it in absolute alinement with the axle and the bearing sleeve 3. The roller bearing is thus supported against tilting movement and it will be impossible to jam or wedge the same while it is being removed. The operation of removing the roller bearing is in this manner quickly and easily accomplished and the difficulties heretofore generally encountered are positively eliminated.

The tool is simple and substantial in construction and is just sufficiently long to permit it to be securely gripped by the operator when the bearing is to be removed as it is thereby possible to exert the necessary pull. The tool is otherwise light, as it is entirely hollow and it should be cheaply manufactured as the only machine work required would be a drilling and threading of lug 8 for the reception of the screw 9 and a slight finishing of the interior and exterior surface of the annular projection 12.

The tool may be constructed of cast iron or any other material desired, and we further wish it understood that various changes in the form, proportion and minor details of construction may be resorted to without departing from the spirit of our invention as disclosed in the appended claims.

Having thus described our invention, what we claim and desire to secure by Letters Patent is:

1. A tool for removing roller bearings comprising a holder and means on said holder for gripping one end of the roller bearing to permit an endwise pull to be exerted when the bearing is to be removed.

2. A tool for removing roller bearings comprising a holder, means on said holder for gripping one end of the roller bearing to permit an endwise pull to be exerted when the bearing is to be removed, and means for engaging or disengaging said gripping means.

3. A tool for removing roller bearings from the rear axle housing of an automobile, said tool comprising a sleeve-like member adapted to slip over the axle end, an annular shoulder projection on the sleeve adapted to engage one end of the roller bearing, said sleeve and annular shoulder being split, and means for expanding the sleeve and the annular shoulder to grip the roller bearing.

4. A tool for removing roller bearings from the rear axle housing of an automobile, said tool comprising a sleeve-like member split at one end, an annular shoulder forming a continuation of the split sleeve, a lug formed on the sleeve, one on each side of the split, and a screw passing through one lug and engageable with the opposite lug to expand the sleeve and the annular shoulder extension formed thereon.

In testimony whereof we have hereunto set our hands in the presence of two subscribing witnesses.

EDWIN B. CANTRELL.
GEORGE E. MILLER.

Witnesses:
W. W. HEALEY,
JOHN H. HERRING.

Copies of this patent may be obtained for five cents each, by addressing the "Commissioner of Patents, Washington, D. C."